June 22, 1926. 1,589,662
H. R. RICARDO
INTERNAL COMBUSTION ENGINE
Filed July 7, 1924
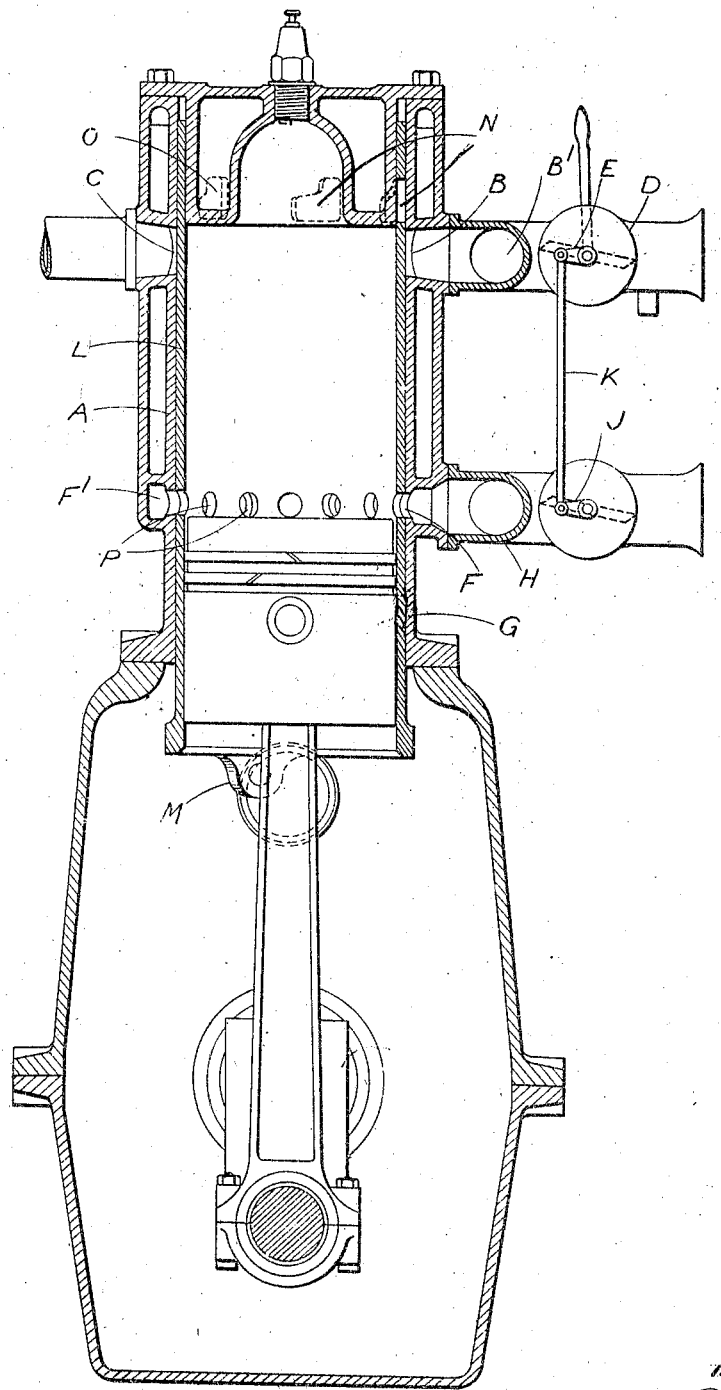
INVENTOR.
Harry Ralph Ricardo,
BY Watson, Coit, Morse & Grindle
ATTYS.

Patented June 22, 1926.

1,589,662

UNITED STATES PATENT OFFICE.

HARRY RALPH RICARDO, OF LONDON, ENGLAND.

INTERNAL-COMBUSTION ENGINE.

Application filed July 7, 1924, Serial No. 724,706, and in Great Britain July 13, 1923.

This invention relates to internal combustion engines operating on the four-stroke cycle in which the inflow and outflow of all gases into and from the cylinder are controlled by one or more sleeve valves moved in relation to fixed side ports and has for its object to adapt such engines for operation with weak means mixture strengths.

By working with such mixture strengths it is possible to obtain the advantage of the consequent low flame temperature which results in an increased thermal efficiency and reduces heat flow to the various heated parts. Unfortunately, it is not possible to use a homogeneous weak mixture in an internal combustion engine operating with liquid hydrocarbon fuels as the rate of burning is too low and it has been found that the weakest mixture that can be burned efficiently in a single cylinder engine is one which is about 15% weaker than a complete combustion mixture but the distribution errors in a multi-cylinder engine reduce this margin to about 5% or even eliminate it altogether. In practice, most road vehicle multi-cylinder engines are normally run on a distinctly rich mixture in order to allow for the imperfections of distribution and carburation.

According to this invention supplementary ports in the cylinder wall controlled by the sleeve valve are disposed where they will be uncovered by the piston at or near the end of its outstroke and are in direct communication through a passage with the atmosphere, a throttle valve being preferably arranged in this passage with an interconnection between this throttle valve and the carburettor or other throttle valve in the main induction passage. With such an engine at full main throttle only a small quantity of the supplementary charge enters the cylinder since the depression in the cylinder at the end of the suction stroke is only small, this small supplementary charge being carburetted by the excess fuel in the main charge, which is preferably somewhat rich, while as the main charge is progressively throttled, an increasing amount of supplementary charge is drawn in owing to the increase in the depression in the cylinder at the end of the suction stroke so that the mean mixture strength rapidly decreases.

This is of importance in road traction work where the engine is but rarely working at full load since the benefits which result from working with a weak mixture will be obtainable for the greater part of the running life of the engine, while at the same time the full power output is always available. The supplementary charge is formed of air with or without an admixture of inert gas or a combustible charge which is substantally weaker than the main charge.

If the main charge is considerably throttled, the amount of the supplementary charge drawn in if unrestricted would be excessive and the main charge would be unduly diluted since the stratification is never absolutely perfect. It is desirable therefore to constru t the throttle controlling the supplementary charge so as to restrict the inflow of this charge when necessary.

The invention may be applied to various structures of sleeve valve engine of the type indicated whether such engines have, for example, two sleeves separately reciprocated or a single sleeve to which an ellipsoidal movement is imparted in the cylinder, that is to say, a combined reciprocating and rotary movement. The accompanying drawing illustrates in sectional elevation one method of carrying out the invention in practice as applied to an engine having a single sleeve valve. The section is taken through one of the cylinders in a plane at right angles to the crankshaft axis.

The main cylinder A is formed with one or more inlet ports B and one or more exhaust ports C situated opposite the inlet ports all these ports being disclosed so that they are at or above the position occupied by the piston at the end of its instroke. The main charge flows to the inlet ports B through an induction pipe B' from a carburettor D and its flow is controlled by a throttle E. In the cylinder wall are formed a series of ports F conveniently arranged in a ring and positioned where they will be uncovered by the piston G at or towards the end of its out-stroke. The ports F communicate with an annular chamber F' surrounding the cylinder and the supplementary charge flows into this chamber F' from an induction pipe H which is open to the atmosphere the flow being controlled by a throttle J which is conveniently interconnected with the throttle E as for example by a link K. A sleeve valve L lies and is moved within the cylinder A by some known device such as indicated at M by means of which a compound movement is imparted to the sleeve such a movement being partly reciprocation within the cylinder A and partly a rotation about the cylinder axis. In the sleeve there are formed towards its inner end ports N adapted to coincide with the inlet ports B and ports O adapted to coincide with the exhaust ports C. There is also formed in the sleeve a ring of ports P which can be brought into coincidence with the ring of ports F through which the supplementary charge enters.

The positions of the inlet ports N, the exhaust ports O and the supplementary ports P in the sleeve L and the movements imparted to this sleeve are such that the ports F will be opened for the flow of the supplementary charge into the cylinder at the end of the suction stroke after the main inlet ports have been closed but the supplementary ports F will be closed at the end of the expansion stroke when the exhaust port C is open and also at the end of the instroke of the piston G when the skirt of the piston has passed beyond the plane in which lie the ports F.

As it is unnecessary to reduce the amount of the supplementary charge flowing to the ports F until the main charge entering through the ports B has been considerably restricted, it is preferable not to restrict the flow of the supplementary charge through the supply pipe H until the main throttle E has been closed to an appreciable extent. This end may be attained by suitably arranging the linkage K or other mechanical connection between the throttles E and J or by making the throttle J of such a size that when fully open it will allow for the free flow of a volume of air or gas in excess of that which can flow through the passage H. The first portion of the closing movement of the throttle J will then have no appreciable effect on the flow of air or gas through the passage H.

In an engine constructed according to the present disclosure the combustible mixture is drawn in through the main inlet port during practically the whole of the suction stroke of the piston, the subsidiary inlet port being open only at the end of such stroke. Thus during the period when mixture is being drawn in through the main inlet port, the mean speed of the piston is relatively high since it includes the center portion of the piston stroke, while during the period when the subsidiary ports are open, the piston is moving more slowly. As a result of this, mixture entering through the main inlet port when the main throttle valve is fully open moves at relatively high speed while that entering through the subsidiary inlet port moves only slowly. The rate of flow in the subsidiary inlet passage during the time that the subsidiary inlet ports are open, is in fact so slow that the same amount of gas could flow freely through a much more restricted passage with the result that the initial closing of the subsidiary throttle valve does not appreciably restrict the free flow of gas therethrough. The rate of flow in the main inlet passage on the other hand is high, so that the initial closing of the main throttle valve does effect the flow therethrough. It will be seen that as the main throttle valve is progressively closed that the depression in the cylinder at the end of its stroke increases, thus tending to draw in a greater amount of subsidiary charge and bringing about a tendency for the speed of the charge entering through the subsidiary inlet passage to increase. After a certain point in the closing of the main throttle valve is reached, the flow in the subsidiary inlet passage will have increased to such a degree that the subsidiary throttle valve will begin to have an effect thereon and tend to reduce the amount of subsidiary charge drawn into the cylinder, as above set forth.

The carburettor D is preferably so adjusted as to supply a somewhat rich main charge under all conditions as for instance 10% to 15% rich and thus provide a safe margin for inequalities in distribution and errors in carburation.

The details of construction may be modified as found desirable in accordance with the general structure of the engine to which the invention is applied.

What I claim as my invention and desire to secure by Letters Patent is:—

1. In an internal combustion engine operating on the four-stroke cycle, the combination of a piston, a cylinder having main inlet and exhaust ports adjacent to the head of the cylinder and a number of supplementary inlet ports situated around the cylinder where they will be uncovered substantially simultaneously by the piston towards the end of its out-stroke to admit a supplementary charge of air, a ported sleeve valve having its ports so arranged that when the supplementary inlet ports are open the main inlet ports are closed, means for operating the sleeve valve so as to close the main inlet ports and open the supplementary inlet ports at the end of the suction stroke, a passage through which air passes to the supplementary inlet ports, and a throttle valve controlling the flow of gas to the main inlet port, the arrangement being such that at full main throttle only a small quantity of supplementary charge will enter the cylinder while as the main charge is progressively throttled an increasing amount of supplementary charge will be drawn in.

2. In an internal combustion engine operating on the four-stroke cycle the combination of a piston, a cylinder having main inlet and exhaust ports adjacent to the head of the cylinder and a number of supplementary inlet ports situated around the cylinder where they will be uncovered substantially simultaneously by the piston towards the end of its out-stroke to admit a supplementary charge of air, a ported sleeve valve having its ports so arranged that when the supplementary inlet ports are open the main inlet ports are closed, means for operating the valve so as to close the main inlet port and open the supplementary inlet ports at the end of the suction stroke, a passage through which air passes to the supplementary inlet ports, a throttle valve in this passage, a second throttle valve controlling the flow of gas to the main inlet port, and an operative connection between these two throttle valves, this connection being so arranged and the relative sizes of the passages controlled by the two throttle valves being so proportioned that at full main throttle only a small quantity of supplementary charge enters the cylinders while as the main charge is progressively throttled up to a certain point an increasing amount of supplementary charge will be drawn in, further throttling of the main charge beyond this point bringing about a restriction in the amount of supplementary charge admitted.

In testimony whereof I have signed my name to this specification.

HARRY RALPH RICARDO.